(12) United States Patent
Asghari et al.

(10) Patent No.: US 8,053,722 B1
(45) Date of Patent: Nov. 8, 2011

(54) DETECTOR HAVING TUNED RESISTORS

(75) Inventors: Mehdi Asghari, San Marino, CA (US); Dawei Zheng, Arcadia, CA (US)

(73) Assignee: Kotura, Inc., Monterey Park, CA (US)

( * ) Notice: Subject to any disclaimer, the term of this patent is extended or adjusted under 35 U.S.C. 154(b) by 604 days.

(21) Appl. No.: 11/899,402

(22) Filed: Sep. 5, 2007

(51) Int. Cl.
  *G01T 1/17* (2006.01)
(52) U.S. Cl. .................................................. 250/252.1
(58) Field of Classification Search ................ 250/252.1
See application file for complete search history.

(56) References Cited

U.S. PATENT DOCUMENTS 5,428,204 A *  6/1995  Uhling et al. ............ 219/121.68
2008/0156993 A1 *  7/2008  Weinberg et al. ........ 250/363.03

OTHER PUBLICATIONS

Landsberger, Les M., "Simplifying Circuit Calibration with Electrically-Adjustable Resistors," Microbridge Technical White Paper, pp. 1-10 (Mar. 2007).

* cited by examiner

*Primary Examiner* — David Porta
*Assistant Examiner* — Yara B. Green
(74) *Attorney, Agent, or Firm* — Gavrilovich, Dodd & Lindsey, LLP (57) ABSTRACT

A method of forming a light sensor array includes tuning a resistance level of a plurality of resistors. The resistors are included in a light sensor array for use with a positron emission tomography (PET) scanner system. The light sensor array includes detection circuits that each includes one of the resistors connected in series with an avalanche photodiode.

21 Claims, 8 Drawing Sheets

DETECTOR HAVING TUNED RESISTORS

FIELD

The present invention relates to systems that employ optical detectors and more particularly, to systems that employ light sensor arrays.

BACKGROUND

A variety of devices make use of use of a light sensor array. Examples of these devices include medical imaging devices such as positron emission tomography (PET) scanners. The light sensor arrays employed in PET scanners has a plurality of pixels. Each of the pixels includes one or more detection circuits that each has a resistor connected in series with an avalanche photodiode. During operation of the device, each detection circuit provides an output signal in response to the avalanche photodiode in that detection circuit receiving a photon. As a result, the output signals from the detection circuits in a pixel can be used to determine the number of photons incident on the avalanche photodiodes in the pixel.

The resistors in the detection circuits of a single device can have a wide range of resistance values. However, the output signal provided by a detection circuit is dependent on the resistor in that detection circuit. Accordingly, the variation in resistor values can cause the output signals from different detection circuits to have a wide range of values. The variation in these output signals can result in an inaccurate determination in the number of photons that are received by the photodiodes in a pixel.

As a result, there is a need for improved light sensor arrays.

SUMMARY

A positron emission tomography (PET) scanner system includes a light sensor array having detection circuits that each includes a resistor connected in series with an avalanche photodiode. A resistance level of the resistors is tuned such that each resistor has a resistance level that is substantially the same. In some instances, the resistance level of each resistors is within the average resistance level for the resistors +/−5% of the average resistance level for the resistors, or is within the average resistance level for the resistors +/−1% of the average resistance level for the resistors, or is within the average resistance level for the resistors +/−5% of the average resistance level for the resistors.

A method of generating a light sensor array includes tuning a resistance level of a plurality of the resistors in a light sensor array. The light sensor array includes detection circuits that each includes one of the resistors connected in series with an avalanche photodiode. In some instance, the light sensor array is suitable for use with a positron emission tomography (PET) scanner system, In one example, the light sensor array is built on a wafer. For instance, the detection circuits can be integrated on a wafer.

BRIEF DESCRIPTION OF THE FIGURES

FIG. 5A and FIG. 5B illustrate a suitable construction of a light sensor array suitable for use in a PET scanning system.

FIG. 6A through FIG. 6I illustrate a method of forming a device having light sensor array according to FIG. 5A and FIG. 5B. In particular, FIG. 6A through FIG. 6I illustrate a method for making a light sensor array having a cross section according to FIG. 5B.

DESCRIPTION

A light sensor array for use with a PET scanner has a plurality of pixels that each includes a plurality of detection circuits. Each detection circuit includes a resistor connected in series with an avalanche photodiode. The detection circuits in each of the pixels are connected in parallel. Since the detection circuits are connected in parallel, the current output by different detection circuits has an additive effect on the output signal for the pixel. The resistance level of the resistors is tuned so each resistor has substantially the same level of resistance. Since the resistors have substantially the same level of resistance, the current of the signal output from each detection circuit in response to the detection circuit receiving a photon is substantially the same. Because the output signal current from each detection circuit is substantially the same in response to receipt of a photon by the detection circuit and the outputs signals from the detection circuits in a pixel are additive, the output signal from the pixel can be used to accurately approximate the number of photons that are incident on the pixel.

Figure 1:
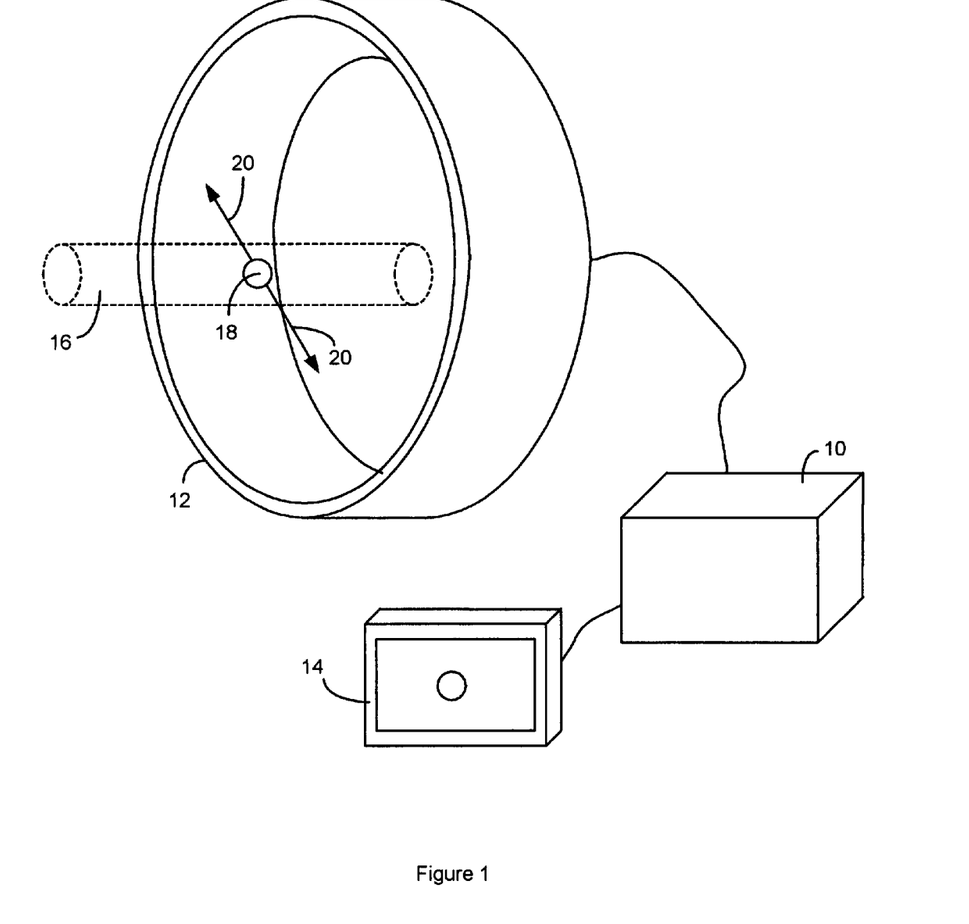
FIG. 1 illustrates a positron emission tomography (PET) scanner system.

FIG. 1 illustrates a positron emission tomography (PET) scanner system. The system includes electronics 10 in communication with a light sensor array 12 and a display 14. The light sensor array 12 has a ring shape or other shape that allows the light sensor array 12 to surround a subject 16 such as a patient.

Before operation of the PET scanner system, a radioactive isotope is delivered into the subject 16 so the isotope accumulates at a site 18 to be imaged by the PET scanner system. The subject 16 is then positioned in the light sensor array 12 such that the light sensor array 12 surrounds the site 18. The isotope decays such that photons 20 are generated traveling in substantially opposite directions. Because the light sensor array 12 receives these photons almost simultaneously, the electronics 10 are able to approximate where each of these photons is received on the light sensor array 12. The electronics 10 can use the two locations where the photons were received on the light sensor array 12 in combination with the opposing directions of the photons to approximate the origin of the photons. Since the photons are located at the site 18 to be imaged, the electronics 10 can repeat this process for many photon pairs to generate an image of the site 18. The electronics 10 can then display the image on the display 14.

Figure 2:
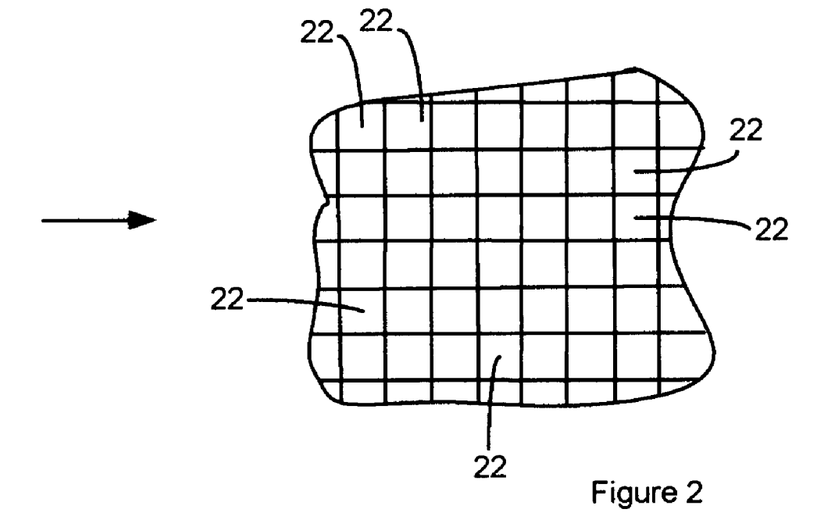
FIG. 2 illustrates a portion of a light sensor array that is suitable for use with a PET scanner system according to FIG. 1. The light sensor array includes a plurality of pixels.

FIG. 2 illustrates a portion of a light sensor array 12 that is suitable for use with a PET scanner system according to FIG.

1. The light sensor array 12 includes a plurality of pixels 22. The electronics 10 are configured to determine the number of photons that are incident on each of the pixels 22.

Figure 3:
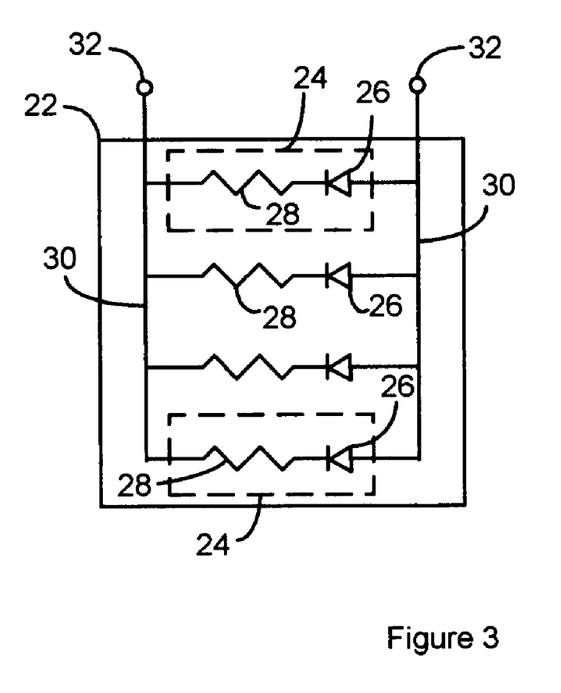
FIG. 3 provides a schematic diagram for detection circuits that are suitable for use in a pixel in a light sensor array according to FIG. 2. Each detection circuit includes a resistor connected in series with an avalanche photodiode.

Each pixel 22 is associated with one or more detection circuits 24. For instance, FIG. 3 provides a schematic diagram for a pixel 22 that is associated with four detection circuits 24. Each detection circuit 24 includes or consists of an avalanche photodiode 26 connected in series with a resistor 28. Each of the avalanche photodiodes 26 can be included in a sub-pixel. For instance, the pixel of FIG. 3 is divided into four sub-pixels. Although FIG. 3 illustrates the sub-pixels are shown arranged in a row, can be arranged in rows and columns and/or in grid or lattice arrangement. For instance, the sub-pixels in a pixel can be arranged as an array of sub-pixels.

Bus lines 30 connect the detection circuits 24 in a pixel in parallel and are in electrical communication with nodes or electrical contacts 32. Electrical energy can be applied to the nodes or electrical contacts 32 to apply a forward bias or a negative bias to the avalanche photodiodes 26 in the pixel and/or to measure the current between the nodes or electrical contacts 32.

Figure 4A:
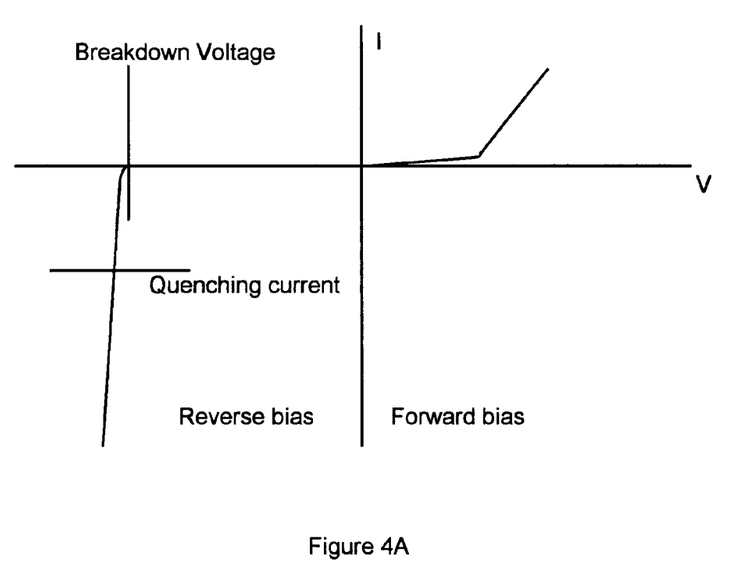
FIG. 4A illustrates the current versus voltage performance of a typical avalanche photodiode.

FIG. 4A illustrates the current versus voltage performance of a typical avalanche photodiode. During operation of the avalanche photodiode, a reverse bias is applied to the photodiode. The reverse bias is applied at a voltage such that receipt of a photon by the avalanche photodiode causes the voltage to drop below a breakdown voltage. As a result, the current of the output signal from the avalanche photodiode increases in response to receipt of the photon. The presence of the resistor in series with the avalanche photodiode limits the current of the output signal to a quenching current. The level of resistance provided by a resistor determines the level of the quenching current.

Figure 4B:
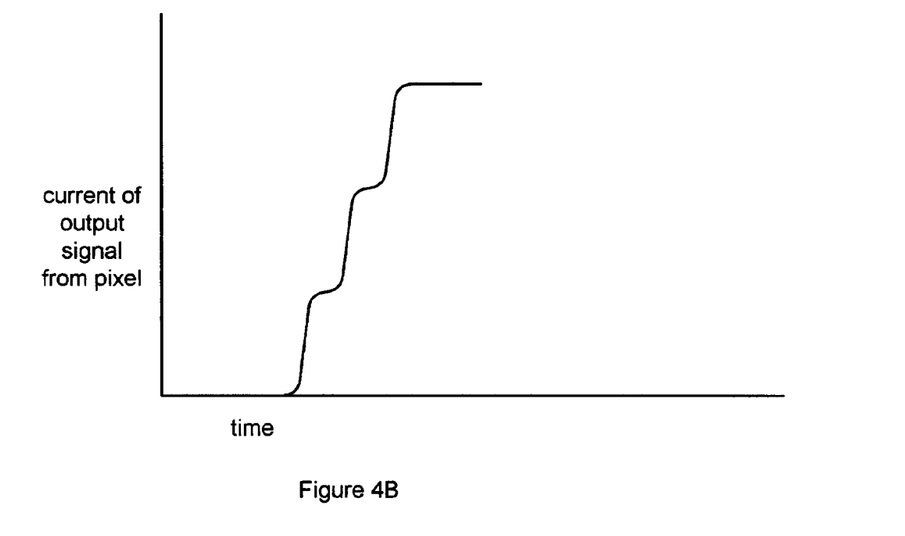
FIG. 4B illustrates the current of an output signal for a detection circuit versus time for detection circuits included within a pixel and connected in parallel according to FIG. 3. The pixel receives three photons over the illustrated period of time.

FIG. 4B illustrates the current of the output signal for a pixel versus time for a pixel having detection circuits connected in parallel according to FIG. 3. FIG. 4B illustrates the response of the output signal for the pixel in response to three different circuits each sequentially receiving a photon. Since the detection circuits are connected in parallel, the current of the output signal from each of the detection circuit in the pixel is additive. As a result, the current of the output signal shows three different increases. When each of the resistors provides about the same level of resistance, the amount of the current increase is about the same for each photon. Accordingly, the electronics 10 can employ the level of output signal current to approximate the number of photons received by the pixel. For instance, dividing the level of the output signal current by the current increase associated with receipt of a single photon can provide an approximation of the number of photons received by the pixel.

Figure 5A:
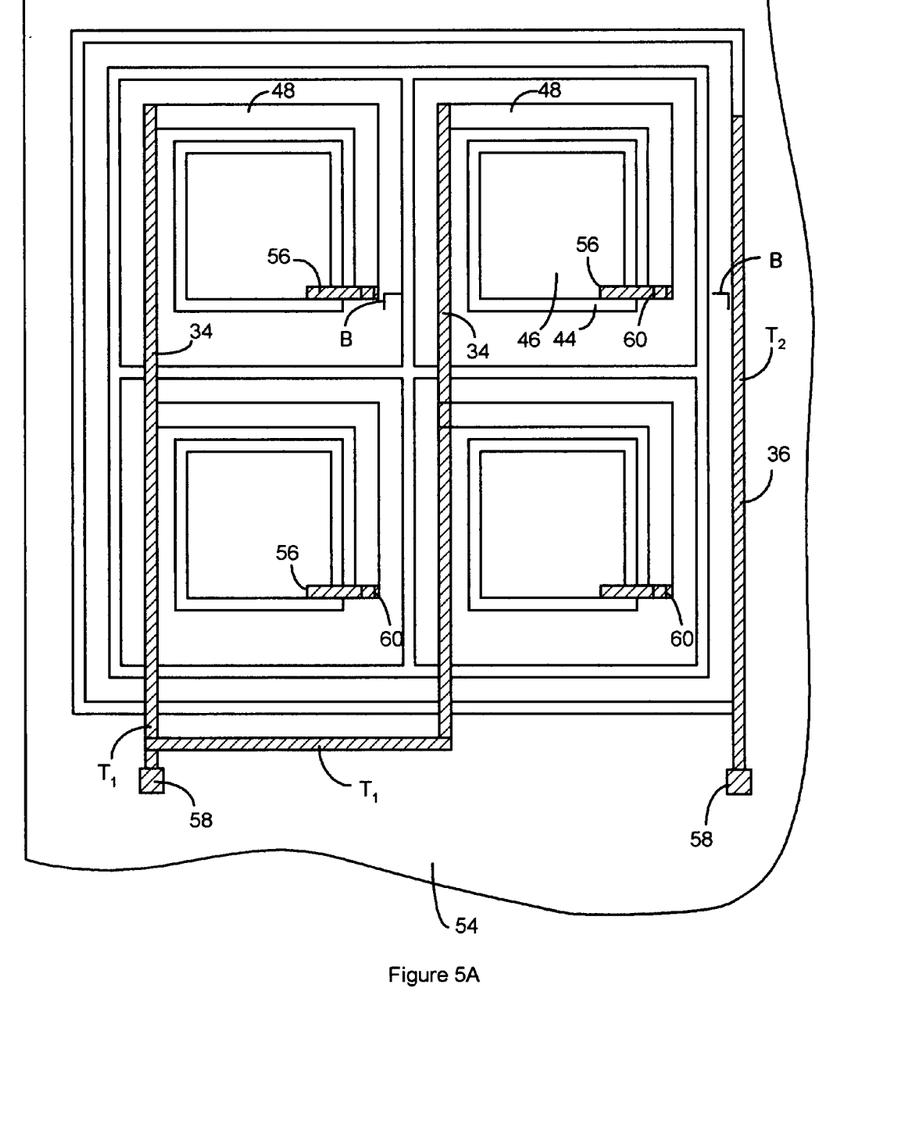
FIG. 5A is a topview of a portion of the light sensor array and FIG. 5B is a cross section of the light sensor array shown in FIG. 5A taken along a line extending between the brackets labeled B in FIG. 5A.
Figure 5B:
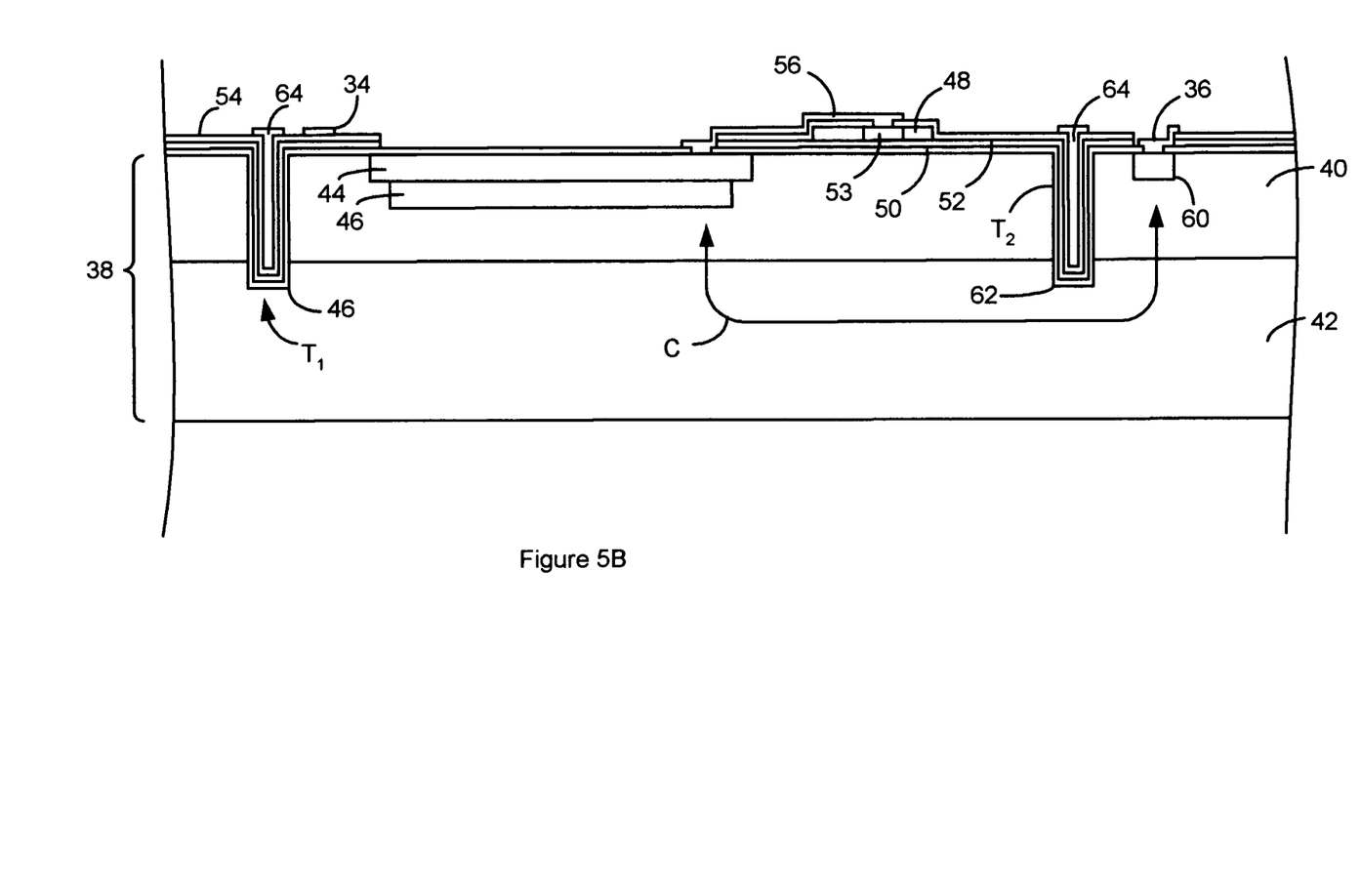

FIG. 5A and FIG. 5B illustrate a suitable construction of a light sensor array suitable for use in a PET scanning system. FIG. 5A is a topview of a portion of the light sensor array and FIG. 5B is a cross section of the light sensor array shown in FIG. 5A taken along a line extending between the brackets labeled B in FIG. 5A. The light sensor array includes a plurality of detection circuits. First metal traces 34 and second metal traces 36 on the device can provide electrical communication between different detection circuits in a pixel. For instance, the first metal traces 34 and the second metal traces 36 can serve as the bus lines of FIG. 3.

The light sensor array is constructed on a wafer 38. The wafer 38 can have a single layer of material or multiple layers of material. For instance, the illustrated wafer 38 includes an upper region 40 on a substrate 42. In one example, the substrate 42 is silicon and the upper region 40 is a layer of epitaxial silicon grown on the silicon substrate 42. In some instances, the substrate 42 is doped with a p-type dopant to a concentration on the order to $10^{18}$ and the epitaxial silicon is doped with a p-type dopant to a concentration on the order to $10^{15}$.

Each detection circuit includes an upper doped region 44 and a lower doped region 46. The upper doped region 44 is an n-type region when the lower doped region 46 is a p-type region and the upper doped region 44 is a p-type region when the lower doped region 46 is an n-type region. Additionally, the top of the lower doped region 46 contacts the bottom of the upper doped region 44. As a result, the upper doped region 44 and the lower doped region 46 include a p-n junction and serve as the avalanche photodiode. Suitable dopants for the n-type region include, but are not limited to, phosphorus and/or arsenic. Suitable dopants for the p-type regions include, but are not limited to, boron.

The detection circuits each include a resistor material 48 that serves as a resistor in a detection circuit. A first layer 50 and a second layer 52 are positioned between the resistor material 48 and the wafer 38. The first layer 50 and the second layer 52 are shown in FIG. 5B but are not shown in FIG. 5A. The first layer 50 and/or the second layer 52 can electrically insulate the resistor material 48 from the wafer 38. The first layer 50 and/or the second layer 52 can represent a single layer of material or can represent multiple layers of material. In one example, the first layer 50 represents an oxide layer ($SiO_2$) and a nitride layer (SiN) arranged so the oxide layer is between the nitride layer and the wafer 38, and the second layer 52 represents an oxide layer. A suitable insulation layer includes, but is not limited to, an oxide layer. A suitable material for the resistor material 48 includes, but is not limited to, polysilicon.

A region of the resistor material 48 includes a supplemental doped region 53. The supplemental doped region 53 can include an n-type dopant or a p-type dopant. The added conductivity of the supplemental doped region 53 can serve to increase electrical conductivity of this region of the resistor material 48. In one example, the supplemental doped region 53 is doped with a p-type dopant to a concentration on the order of $5 \times 10^{18}$ cm$^{-3}$.

An optional third layer 54 is positioned on the second layer 52 and also on the resistor material 48. The third layer 54 can serve as a passivation layer and/or to isolate electrical connections to particular area of the resistor material 48. A suitable third layer 54 includes, but is not limited to an oxide layer such as $SiO_2$.

A first electrical connector 56 extends through the third layer 54 into electrical communication with the supplemental doped region 53 of the resistor material 48 and also in electrical communication with the upper doped region 44. Accordingly, the first electrical connector 56 provides electrical communication between the resistor material 48 and the upper doped region 44. As a result, the first electrical connector 56 serves to connect the resistor of a detection circuit to the avalanche photodiode of a detection circuit. The first metal traces 34 provide electrical communication between the resistor material 48 in each of the detection circuits and a contact pad 58. As a result, the second electrical connector serves as one of the bus line of FIG. 3. In view of the above connections, the first metal trace 34 is in electrical communication with the upper doped region 44 through the resistor material 48 and the first electrical connector 56. Accordingly, electrical energy from the contact pad 58 flows through the resistor material 48 before flowing to the avalanche photodiode in accordance with the detection circuit illustrated in FIG. 3.

The level of resistance provided by the resistor material 48 can be increased by increasing the distance that electrical energy flows through the resistor material 48. Accordingly, the level of resistance provided by the resistor material 48 can be increased by increasing the distance between the first electrical connector 56 and the first metal trace 34. Alternately, the level of resistance provided by the resistor material 48 can be decreased by decreasing the distance that electrical energy flows through the resistor material 48. Accordingly, the level of resistance provided by the resistor material 48 can be decreased by decreasing the distance between the first electrical connector 56 and the first metal trace 34.

The wafer 38 also includes a common doped region 60 extending into the upper region 40 of the wafer 38. The common doped region 60 can include an n-type dopant or a p-type dopant. In one example, the common doped region 60 includes a p-type dopant. The metal trace extends through the first layer 50, the second layer 52, and the third layer 54 into electrical communication with the common doped region 60. The second metal trace 36 is also in electrical communication with a contact pad 58. Accordingly, the second metal trace 36 provides electrical communication with the contact pad 58 and the common doped region 60. During operation of the pixel, the second metal trace 36 and the common doped region 60 act together to serve as a current collector that collects current through each of the avalanche diodes. Accordingly, each common doped region 60 can surround all or a portion of the avalanche diodes in a pixel.

Trenches 62 extend into the wafer 38. A portion of the trenches 62 can serve to increase optical isolation between different avalanche diodes. For instance, the trench 62 labeled $T_1$ in FIG. 5B can reduce cross-talk between the illustrated avalanche diode and the adjacent avalanche diode. Metal 64 can be positioned in the trench 62 to enhance the reduction in cross talk. A portion of the trenches 62 can serve to reduce electrical cross-talk and/or leakage. For instance, the trench 62 labeled $T_2$ in FIG. 5B can reduce leakage between the avalanche diode and the second metal trace 36 or the common doped region 60. As is evident from FIG. 5A, the trenches 62 can be interconnected.

In some instances, the trenches 62 can extend into the wafer 38 below the level of the doped regions. For instance, FIG. 5B shows the bottom of the trenches 62 positioned below the lower doped region 46. Extending the trenches 62 further into the wafer 38 can increase the degree of electrical isolation of the detection circuits. Additionally or alternately, the trenches 62 can extend down to the substrate 42 or through the upper region 40 of the wafer 38 as is evident in FIG. 5B.

During operation of a light sensor array constructed according to FIG. 5A and FIG. 5B, an electrical potential can be applied between the contact pads 58. The potential can result in a current that flows through the device along the path illustrated by the arrow labeled C in FIG. 5B.

FIG. 6A through FIG. 6I illustrate a method of forming a device having light sensor array according to FIG. 5A and FIG. 5B. In particular, FIG. 6A through FIG. 6I illustrate a method for making a light sensor array having a cross section according to FIG. 5B.

Figure 6A:
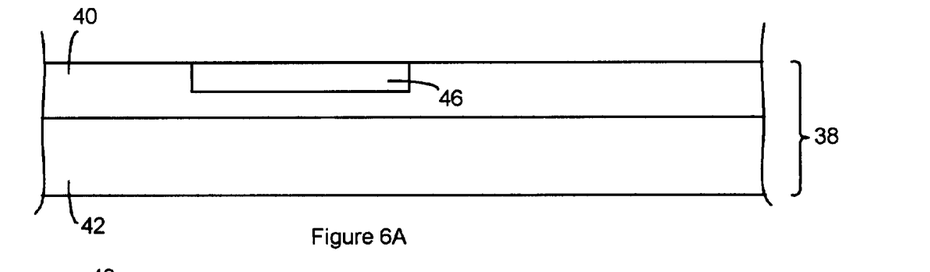

FIG. 6A illustrates a wafer 38 having a substrate 42 and an upper region 40 that includes or consists of epitaxial silicon. The wafer 38 of FIG. 6A can be formed from a silicon wafer. In one example, the silicon wafer is implanted with a p-type dopant to a concentration on the order of $10^{18}$. Epitaxial silicon is then grown on the silicon wafer and the epitaxial silicon is implanted with a p-type dopant to a concentration on the order to $10^{15}$. A photoresist is then formed on the wafer 38 such that the region where the lower doped region 46 is to be formed remains exposed. The lower doped region 46 is implanted with a p-type dopant to a concentration on the order of $10^{17}$. The photoresist is removed to provide the wafer 38 of FIG. 6A.

Figure 6B:
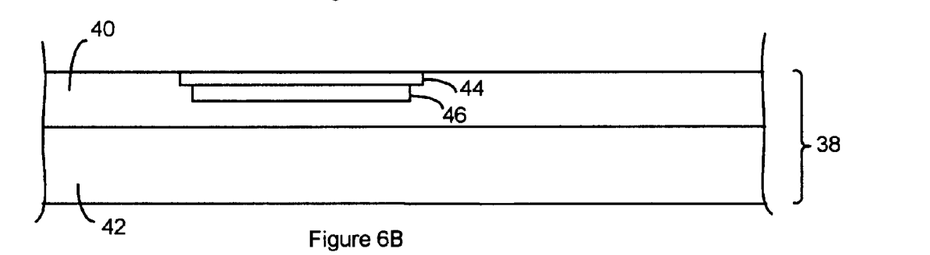

The upper doped region 44 is formed on the device so as to provide the device of FIG. 6B. For instance, a photoresist is formed on the device of FIG. 6A such that the region where the upper doped region 44 is to be formed remains exposed. The upper doped region 44 is implanted with an n-type dopant to a concentration on the order of $10^{19}$. The photoresist is removed to provide the device of FIG. 6B.

Figure 6C:
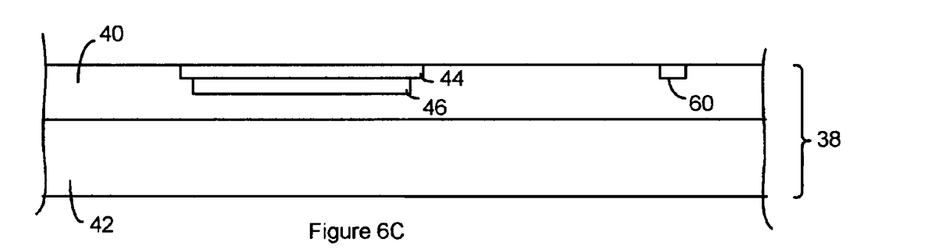

The supplemental doped region 53 is formed on the device so as to provide the device of FIG. 6C. For instance, a photoresist is formed on the device of FIG. 6B such that the region where the supplemental doped region 53 is to be formed remains exposed. The supplemental doped region 53 is implanted with a p-type dopant to a concentration on the order of $10^{19}$. The photoresist is removed to provide the device of FIG. 6C.

Figure 6D:
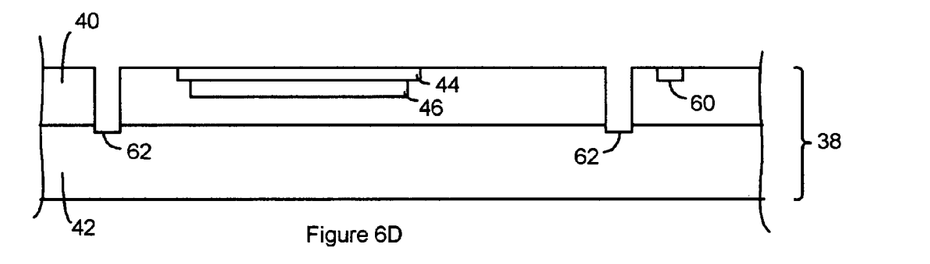

The trenches 62 are formed on the device so as to provide the device of FIG. 6D. For instance, a photoresist is formed on the device of FIG. 6C such that the region where the trenches 62 are to be formed remains exposed. The trenches 62 are then etched to the desired depth with a dry etch or a wet etch. The photoresist is removed to provide the device of FIG. 6D.

Figure 6E:
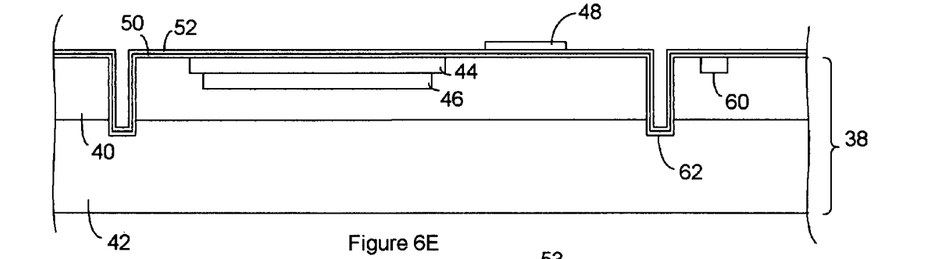
Figure 6F:
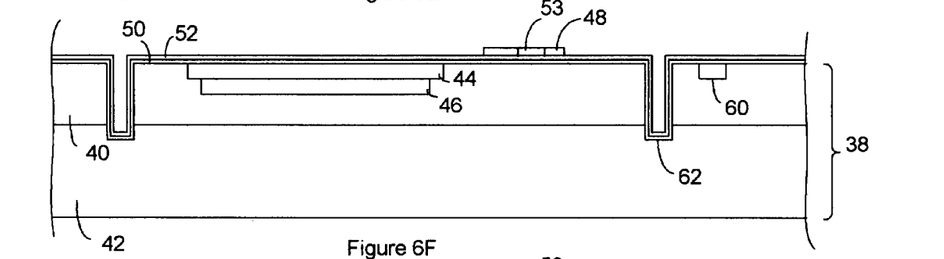

The first layer 50, the second layer 52, and the resistor material 48 are formed on the device so as to provide the device of FIG. 6E. For instance, the first layer 50 can be formed by thermally oxidizing the device to form a layer of $SiO_2$ and then depositing a layer of SiN on the layer of $SiO_2$. The second layer 52 can be formed by depositing a layer of $SiO_2$ on the first layer 50. A photoresist is formed on the device with the region where the resistor material 48 is to be positioned remaining exposed. The resistor material 48 is then grown or deposited. For instance, polysilicon can be deposited on the exposed portion of the device. The photoresist can be removed to provide the device of FIG. 6E.

Figure 6G:
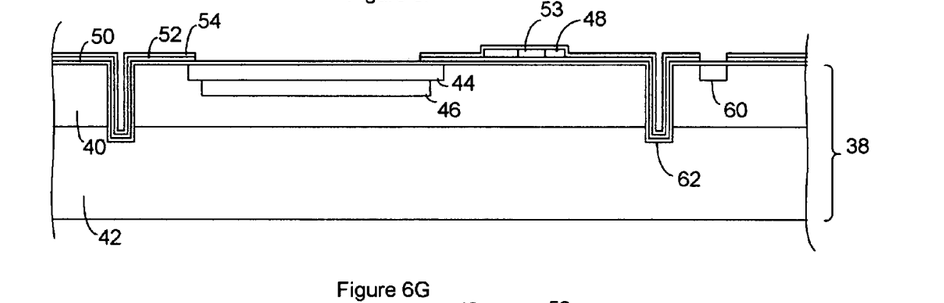

The supplemental doped region 53 is formed on the device so as to provide the device of FIG. 6G. For instance, a photoresist is formed on the device of FIG. 6E with the region where the supplemental doped region 53 is to be formed remaining exposed. The supplemental doped region 53 is then deposited with a p-type dopant to a concentration on the order of $2 \times 10^{20}$ $cm^{-3}$. The photoresist is removed to provide the device of FIG. 6F.

The third layer 54 is formed on the device and portions of the third layer 54 and the second layer 52 are removed so as to provide the device of FIG. 6G. The third layer 54 can be formed by depositing a layer of $SiO_2$ on the second layer 52 and on the resistor material 48. Windows can then be opened that extend through the third layer 54 and the second layer 52. One of the windows is positioned over the portion of the upper doped region 44 that is to be connected to the first metal trance and another one of the windows is positioned over the portion of the supplemental doped region 53 that is to be connected to the second metal trace 36. The windows can be forming a photoresist on the device with the regions where the windows are to be formed remaining exposed. The windows can then be etched down to the first layer 50. In some instances, the etch is selected so the first layer 50 serves as an etch stop during this etch. The photoresist is removed to provide the device of FIG. 6G.

Figure 6H:
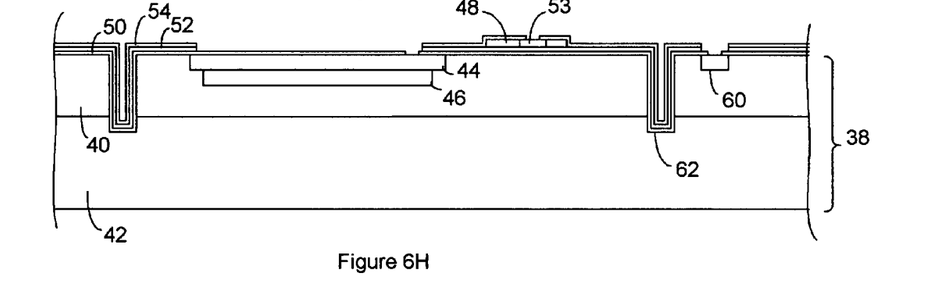

Second windows are opened in the first layer 50 that was exposed during the generation of the device of FIG. 6G so as to provide the device of FIG. 6H. Additionally, FIG. 6G shows a second window opened through the third layer 54 over the resistor material 48. One of the second windows is opened where the first electrical connector 56 will be attached to the upper doped region 44. Another of the second windows is opened where the first electrical connector 56 will be attached to the resistor material 48. Another of the second windows is opened where the second metal trace 36 will be attached to the common doped region 60. Although not illustrated in FIG. 6G, another second window is opened where the first metal trace 34 will be attached to the resistor material 48. The second windows can be formed by forming a photoresist on the device with the regions where the second windows are to be formed remaining exposed. The second windows can then be etched down to the desired depth. The photoresist is removed to provide the device of FIG. 6H.

Figure 6I:
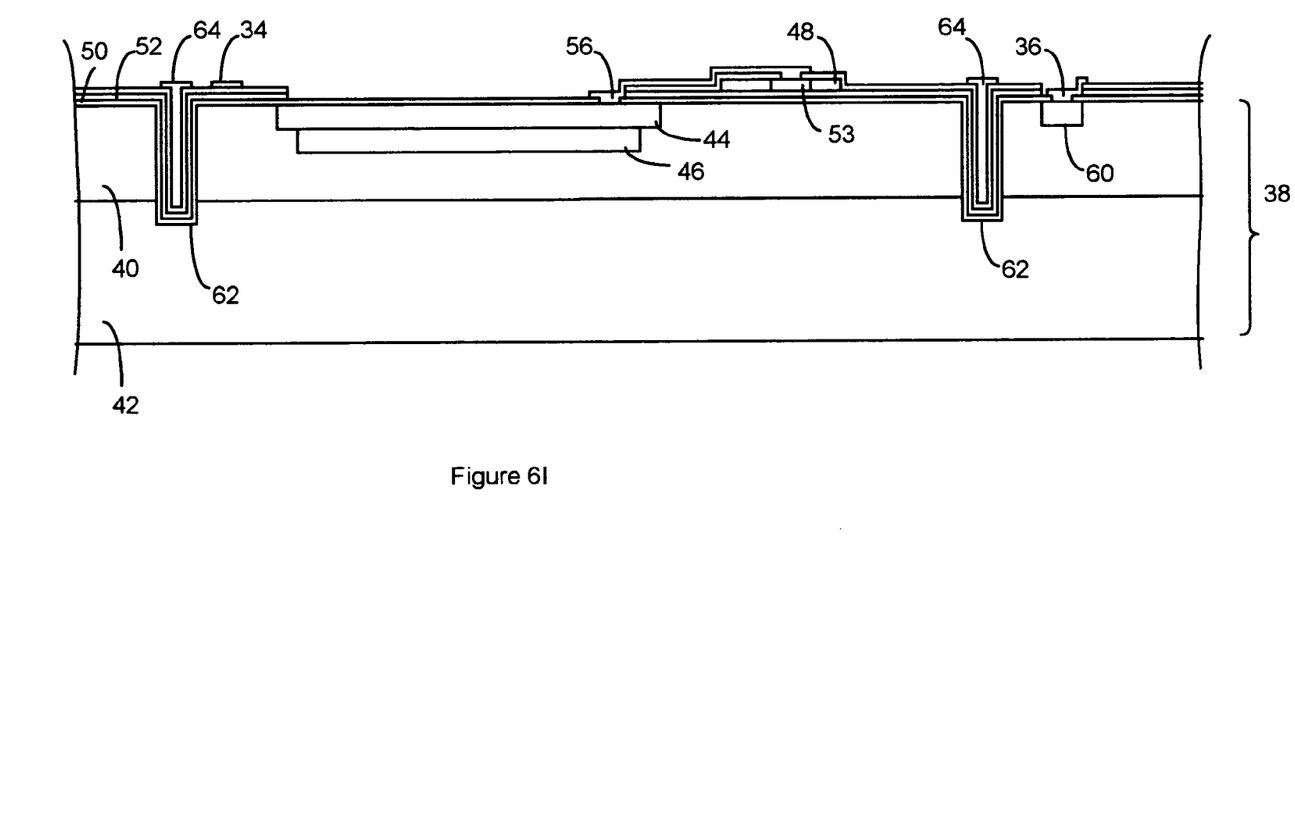

The metal portions are formed on the device so as to provide the device of FIG. 6I. For instance, metal can be sputtered onto the device of FIG. 6H. A suitable metal for sputtering includes, but is not limited to, Ti/Al. A photoresist can be formed on the device so the regions of the device where metal is desired are protected. For instance, the photoresist can protect the metal over the trenches 62 as well as the regions where the first metal trace 34, the second metal trace 36, and the first electrical connector 56 are to be formed. An etch can then be performed so as to define the first metal trace 34, the second metal trace 36, and the first electrical connector 56 on the device. The photoresist is then removed so as to provide the device of FIG. 6I.

The resistance of one or more resistors in a light sensor array can be tuned. For instance, when the resistor material 48 includes polysilicon, the resistance level can be tuned by selectively removing material. Suitable methods for selectively removing resistor material 48 include using a laser to illuminate the resistor material 48. When the resistor material 48 is polysilicon, a suitable laser is a 3W Nd-YAG laser emitting at 1.064 nm. Such a laser can be purchased from Laser Systems GmbH in Germany. Removal of resistor material 48 can generally increase the resistance of the resistor. As a result, the resistance of a particular resistor can be trimmed to within ±2% of its nominal value. Tuning the resistance level of the polysilicon can include applying energy to the polysilicon such that grains in the polysilicon re-organize.

The resistance of the resistors in the detection circuits can be tuned so the resistance level of the resistors is substantially the same. For instance, the resistance for resistors with a resistance less than a target level can be increased up to the target level while the resistance for resistors circuits with a resistance above the target level can be left unchanged. In some instance, the target level is not pre-determined but is determined by identifying the resistor with the highest resistance level or a resistance level closest to the highest resistance level. The resistance of the identified resistor can serve as the target level.

The resistances can be tuned to substantially the same resistance for each of the resistors in the light sensor array. Alternately, the resistors in each pixel can be tuned to have substantially the same resistance. As a result, the resistors in different pixels can be tuned to different resistances while the resistors in any one of the pixels is tuned to have substantially the same resistance. When the resistors in different pixels are tuned to different levels, the electronics can compensate for the difference between the resistors in different pixels.

The above methods can provide a light sensor array where the resistance level of each resistor is in a range of the average resistance +/−8% of the average resistance, +/−3% of the average resistance, or +/−1% of the average resistance.

Although the method and device above are described as having metal traces, other conductors can be employed such as wires. Additionally or alternatively, the conductors need not be metal. Although the method and device above are described as employing a common doped region 60 that is common to a plurality of avalanche photodiodes, the device can optionally be constructed with a plurality of doped regions that are each associated with a single avalanche photodiode.

Although the light sensor array is described in the context of a positron emission tomography (PET) scanner, the light sensor array is suitable for use with other scanners including scanners having non-medical applications. Additionally, the light sensor array can be employed in applications outside of medical fields.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. A method, comprising:
   tuning a resistance level of a plurality of resistors,
      the resistors being included in a light sensor array for use with a positron emission tomography (PET) scanner system,
      the light sensor array including detection circuits that each includes one of the resistors connected in series with an avalanche photodiode.

2. The method of claim 1, wherein an electrically resistive material in each of the resistors includes polysilicon.

3. The method of claim 2, wherein tuning the resistance levels includes tuning a resistance level of the polysilicon.

4. The method of claim 3, wherein tuning the resistance level of the polysilicon includes applying energy to the polysilicon such that grains in the polysilicon re-organize.

5. The method of claim 3, wherein tuning the resistance level of the polysilicon includes applying laser energy to the polysilicon.

6. The method of claim 1, wherein tuning the resistance level includes increasing the resistance level and excludes decreasing the resistance level.

7. The method of claim 1, wherein the resistance levels are tuned such that each resistor has substantially the same resistance.

8. The method of claim 1, wherein the resistance levels are tuned such that each resistor has a resistance level in a range of the average of the resistance levels for the resistors +/−1% of the average of the resistance levels for the resistors.

9. The method of claim 1, wherein the resistance levels are tuned such that each resistor has a resistance level in a range of the average of the resistance levels for the resistors +/−0.5% of the average of the resistance levels for the resistors.

10. The method of claim 1, wherein each avalanche photodiode includes doped regions, the doped regions including a p-type region contacting an n-type region so as to form a p-n junction.

11. The method of claim 10, wherein the doped regions include dopants in silicon.

12. The method of claim 11, wherein the resistors include polysilicon in contact with one of the doped regions.

13. The method of claim 1, wherein the resistors and the avalanche photodiodes are on a wafer.

14. A positron emission tomography (PET) scanner system, comprising:
- a light sensor array having detection circuits that each includes a resistor connected in series with an avalanche photodiode,
    - a resistance level of the resistors tuned such that each resistor has a resistance level in a range of an average of the resistance levels for the resistors +/−1% of the average of the resistance levels for the resistors.

15. The system of claim 14, wherein the resistance level of the resistors is tuned such that each resistor has a resistance level in a range of the average of the resistance levels for the resistors +/−0.5% of the average of the resistance levels for the resistors.

16. The system of claim 14, wherein each avalanche photodiode includes doped regions, the doped regions including a p-type region contacting an n-type region so as to form a p-n junction.

17. The system of claim 15, wherein the doped regions include dopants in silicon.

18. The system of claim 17, wherein the resistors include polysilicon in contact with one of the doped regions.

19. The system of claim 14, wherein the resistors include polysilicon.

20. The system of claim 14, wherein the resistors and the avalanche photodiodes are on a wafer.

21. The system of claim 14, wherein a plurality of the detection circuits are connected in parallel.

* * * * *